(12) United States Patent
Kang et al.

(10) Patent No.: US 12,466,561 B2
(45) Date of Patent: Nov. 11, 2025

(54) AUTOMATED MONITORING OF VEHICLE EXITS

(71) Applicant: THE BOEING COMPANY, Arlington, VA (US)

(72) Inventors: Junho Kang, Seongnam (KR); Joan Bae, Seoul (KR)

(73) Assignee: The Boeing Company, Arlington, VA (US)

( * ) Notice: Subject to any disclaimer, the term of this patent is extended or adjusted under 35 U.S.C. 154(b) by 23 days.

(21) Appl. No.: 18/623,939

(22) Filed: Apr. 1, 2024

(65) Prior Publication Data
US 2025/0304256 A1 Oct. 2, 2025

(51) Int. Cl.
| | |
|---|---|
| *B64D 11/00* | (2006.01) |
| *G06T 7/70* | (2017.01) |
| *G06V 10/70* | (2022.01) |
| *G06V 20/59* | (2022.01) |
| *G06V 20/64* | (2022.01) |
| *G06V 40/10* | (2022.01) |

(52) U.S. Cl.
CPC ........... *B64D 11/0015* (2013.01); *G06T 7/70* (2017.01); *G06V 10/70* (2022.01); *G06V 20/59* (2022.01); *G06V 20/64* (2022.01); *G06V 40/10* (2022.01); *G06T 2207/30196* (2013.01); *G06T 2207/30268* (2013.01)

(58) Field of Classification Search
CPC ................. B64D 11/0015; G06T 7/70; G06T 2207/30196; G06T 2207/30268; G06V 20/59; G06V 20/64; G06V 10/70; G06V 40/10

USPC .......................................................... 340/945
See application file for complete search history.

(56) References Cited

U.S. PATENT DOCUMENTS

| | | | |
|---|---|---|---|
| 6,633,239 B2 | 10/2003 | Plude et al. | |
| 9,199,716 B2 | 12/2015 | Knijnenburg | |
| 11,649,067 B2 | 5/2023 | Hunt et al. | |
| 2017/0144773 A1* | 5/2017 | Raman | B64D 45/00 |
| 2020/0122856 A1* | 4/2020 | Esimai | B64D 45/00 |
| 2020/0307758 A1* | 10/2020 | Bredemeier | B64C 1/1423 |
| 2022/0121838 A1* | 4/2022 | Goyal | G06V 40/28 |

FOREIGN PATENT DOCUMENTS

| | | |
|---|---|---|
| CN | 212243777 U | 12/2020 |
| GB | 2425638 A | 11/2006 |

* cited by examiner

*Primary Examiner* — Kerri L McNally
(74) *Attorney, Agent, or Firm* — Joseph M. Butscher; The Small Patent Law Group LLC (57) ABSTRACT

The present disclosure provides techniques for machine learning-based monitoring of restricted objects. A set of images depicting an exit on an aircraft is accessed, and at least one image of the set of images is processed using a first machine learning model to determine an orientation of at least a portion of an individual relative to the exit. In response to determining that the orientation is towards the exit, it is determined whether one or more alert criteria are satisfied, where the one or more alert criteria comprise a threshold period of time. In response to determining that the one or more alert criteria are satisfied, one or more alerts indicating the exit are generated.

20 Claims, 6 Drawing Sheets

AUTOMATED MONITORING OF VEHICLE EXITS

FIELD

Aspects of the present disclosure relate to machine learning. More specifically, aspects of the present disclosure relate to machine learning-based monitoring of vehicle exits.

BACKGROUND

A wide (and increasing) variety of vehicles are used to transport passengers, including road-based vehicles (e.g., cars, busses, and the like), watercraft (e.g., ferries, hovercraft, cruise ships, and the like), aircraft (e.g., airplanes, helicopters, and the like), and even spacecraft (e.g., capsules, spaceplanes, and the like). Each vehicle generally includes one or more doorways used for entrance and/or exit (e.g., emergency exits, hatches, and the like). Generally, such exits have little (or no) protection preventing unauthorized opening. This is particularly problematic for commercial ventures (e.g., where the passengers include non-trained or non-expert individuals). For example, recently several commercial flights were interrupted or redirected when passengers opened (or attempted to open) emergency exits in flight.

As a security measure, exits are usually operated by authorized individuals (e.g., flight attendants or other employees). Conventional approaches to securing the exits have heavily relied on the employees' oversight (e.g., tasking flight attendants with monitoring the exits for unauthorized use, in addition to their other duties). However, human-based monitoring for detecting suspicious activity is labor-intensive and may not always be available when operators are occupied. This allows an opportunity for individuals to potentially engage in opening the exit(s) without authorization.

SUMMARY

The present disclosure provides a method in one aspect, the method including: accessing a set of images depicting an exit on an aircraft; processing at least one image of the set of images using a first machine learning model to determine an orientation of at least a portion of an individual relative to the exit; in response to determining that the orientation is towards the exit, determining whether one or more alert criteria are satisfied, wherein the one or more alert criteria comprise a threshold period of time; and in response to determining that the one or more alert criteria are satisfied, generating one or more alerts indicating the exit.

In one aspect, in combination with any example method above or below, determining the orientation of the at least a portion of the individual comprises determining an orientation of a foot of the individual.

In one aspect, in combination with any example method above or below, determining the orientation of the foot of the individual comprises: identifying a toe keypoint and a heel keypoint; and determining that the toe keypoint is relatively closer to the exit, as compared to the heel keypoint.

In one aspect, in combination with any example method above or below, determining the orientation of the at least a portion of the individual comprises determining an orientation of a hand of the individual.

In one aspect, in combination with any example method above or below, determining that the orientation is towards the exit comprises determining that a back of the hand of the individual is visible in the at least one image; and determining that the one or more alert criteria are satisfied comprises determining that the hand of the individual overlaps with a handle of the exit.

In one aspect, in combination with any example method above or below, generating one or more alerts comprises at least one of: (i) activating a vibration alarm on a device of a crewmember of the aircraft; (ii) activating a warning display on a device of a crewmember of the aircraft; (iii) activating a vibration alarm on a seat of a passenger of the aircraft, wherein the seat of the passenger is within a defined proximity to the exit; or (iv) activating a warning display on a seat display of the aircraft, wherein the seat display is within a defined proximity to the exit.

In one aspect, in combination with any example method above or below, the method further comprises, in response to determining that the one or more alert criteria are no longer satisfied, terminating the one or more alerts.

In one aspect, in combination with any example method above or below, the method further comprises processing at least one image of the set of images using a second machine learning model to determine a positioning of an object relative to the exit; and in response to determining, based on the positioning, that the object obstructs at least a threshold percentage of the exit, generating one or more second alerts indicating the exit.

BRIEF DESCRIPTION OF THE DRAWINGS

So that the manner in which the above recited features can be understood in detail, a more particular description, briefly summarized above, may be had by reference to example aspects, some of which are illustrated in the appended drawings.

DETAILED DESCRIPTION

The present disclosure provides techniques and systems to automatically monitor vehicle exits to prevent unauthorized operation and/or obstruction.

In some aspects, a system for real-time detection of passengers attempting unauthorized manipulation of exits (including emergency exits and/or normal exits) is provided. In some aspects, the system may additionally or alternatively enable real-time detection of exit obstructions (e.g., any objects blocking emergency exits). In some aspects, the system utilizes one or more cameras (e.g., a single camera for each exit) and a set of one or more object detection machine learning models to evaluate the image(s) captured by the camera(s). In some aspects, the system presents a new paradigm of functionality in warning systems for vehicles, such as commercial aircrafts, transforming how threat indicators are communicated and presented to operators. For example, in some aspects, the system supplies a comprehensive overview of the door or exit status(es), and may include sensory feedback such as visual alerts on displays and/or haptic feedback through vibrations.

In some aspects of the present disclosure, commercial aircraft (e.g., airplanes) are used as example vehicles where the monitoring system can be deployed. However, aspects of the present disclosure are readily applicable to any vehicle and/or any space having exits or other objects that should not be operated by unauthorized individuals (e.g., an emergency exit in a warehouse, the exit of a train car, doors to off-limits areas of a ferry such as crew quarters, and the like). As used herein, a "restricted object" generally refers to any object or entity that unauthorized individuals are not permitted to access or operate, such as emergency exits (when an emergency is not occurring), firefighting equipment, crew-only areas, and the like.

As discussed in more detail below, in some aspects, the system is configured to use machine learning evaluate image(s) depicting the monitored area(s) (e.g., emergency exits) to recognize and interpret visual information relating to human interference (e.g., a passenger attempting to open the door) and/or non-human interference (e.g., an object obstructing an emergency exit).

Figure 1:
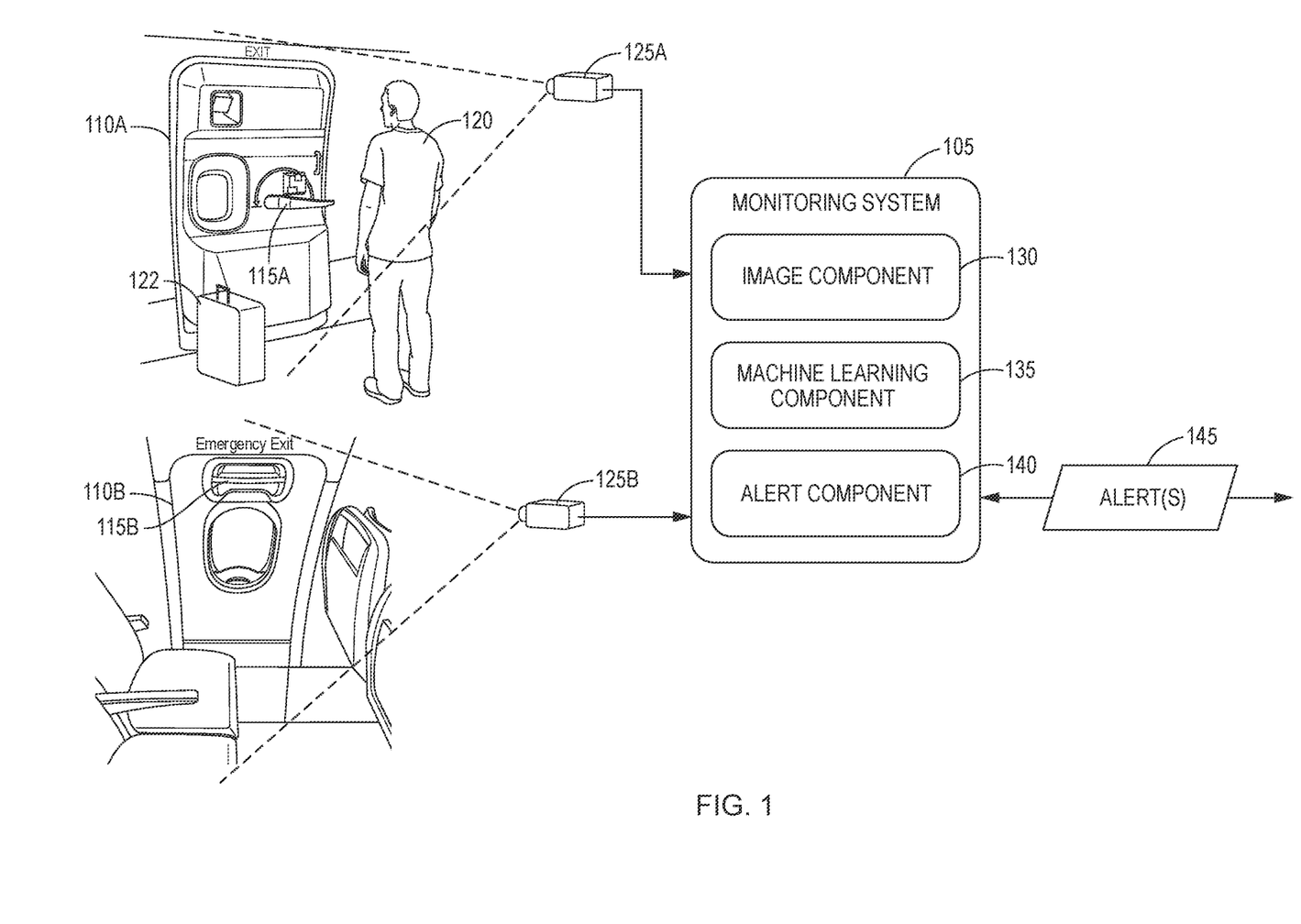
FIG. 1 depicts an example system for automatically monitoring vehicle exits, according to some aspects of the present disclosure.

FIG. 1 depicts an example system 100 for automatically monitoring vehicle exits, according to some aspects of the present disclosure.

In the illustrated example, a monitoring system 105 accesses images captured by one or more camera(s) 125A-B and evaluates the images using machine learning to selectively or dynamically generate alert(s) 145. Although depicted as a discrete system for conceptual clarity, in some aspects, the operations of the monitoring system 105 may be combined or distributed across any number of devices and systems, and may be implemented using hardware, software, or a combination of hardware and software. The cameras 125A-B (collectively, cameras 125) are generally representative of any imaging sensor, and may capture individual images periodically (e.g., every second) or as a continuous stream (e.g., a video stream with 30 frames per second).

As discussed above, each camera 125 is generally associated with one or more restricted objects. That is, each camera 125 is installed and arranged to capture image(s) of one or more restricted object(s) such that the image(s) can be evaluated by the monitoring system 105 to detect interference. In the illustrated example, the restricted objects correspond to exits 110A-B (collectively, exits 110) of a commercial airplane. Specifically, the exit 110A corresponds to a floor-level exit door (e.g., the door(s) at the front of the aircraft just behind the cockpit, the door(s) at the rear of the aircraft just ahead of the rear bulkhead, and/or door(s) along the length of the fuselage, such as spaced sixty feet apart). In some aspects, the exit 110A may serve alternatively as an emergency exit (e.g., only operated in emergencies) or as a standard exit that can also be operated in emergencies (e.g., the door through which passengers board and deplane). In the illustrated example, the exit 110B corresponds to an overwing exit (e.g., an emergency exit through which passengers can exit the plane onto the wing or an emergency slide).

In the illustrated example, the images captured by the camera(s) 125 are evaluated by the monitoring system 105 to detect potential interferences or unauthorized use (e.g., from individuals 120, such as passengers, and/or objects 122, such as garbage bags, luggage, service carts or trolleys, and the like).

In the illustrated example, the monitoring system 105 includes an image component 130, a machine learning component 135, and an alert component 140. Although depicted as discrete components for conceptual clarity, in aspects, the operations of the depicted components (and others not illustrated) may be combined or distributed across any number of components.

In some aspects, the image component 130 may generally be used to access and/or preprocess images captured by the cameras 125. As used herein, "accessing" data may generally include receiving, retrieving, obtaining, capturing, collecting, or otherwise gaining access to the data. Generally, the image component 130 may access the images via any communication medium, including one or more wired and/or wireless links to the cameras 125. In some aspects, the image component 130 performs various preprocessing operations to facilitate or improve the machine learning process, such as to resize or scale the images, denoised the images, extract feature(s) from the images, and the like.

In the illustrated example, the machine learning component 135 may generally be used to process the (potentially preprocessed) images using one or more machine learning models to detect potential interferences. In some aspects, the machine learning model(s) include object detection or classification models. For example, the machine learning component 135 may use model(s) trained to detect individuals, to identify one or more keypoints on human bodies (e.g., hands, fingers, feet, legs, and the like), to detect objects in general, and the like. In some aspects, the particular model(s) and evaluation(s) used to identify interferences may vary depending on the particular implementation, such as based on the particular positioning of the camera(s) 125 relative to the restricted object(s), the type of restricted object (e.g., an overwing exit 110B or a floor-level exit 110A), and the like.

For example, in some aspects, for detecting human interference with a floor-level restricted object (e.g., the exit 110A), the machine learning component 135 may evaluate the image(s) to detect whether an individual is near the restricted object(s) (e.g., whether an individual is depicted in the image(s)). If so, the machine learning component 135 may evaluate image(s) using one or more machine learning models to detect which direction the individual's foot (or feet) are pointing. For example, a pose detection machine learning model (trained to detect human bodies and extract or identify positions of keypoints for various body parts within the input image data) may be used to process the images. In some aspects, the keypoints may include points such as the toe or tip of the foot (or feet) of the individual 120, the heel or back of the foot (or feet) of the individual 120, the head (and/or head orientation) of the individual 120, the hand position and/or orientation of the hand(s) of the individual 120, and the like, These keypoint(s) may be leveraged to detect any attempts to manipulate emergency exits (or other restricted objects), as discussed in more detail below.

As another example, in some aspects, the machine learning component 135 processes the image(s) using one or more hand or gesture recognition models. For example, the model(s) may be trained using an annotated image dataset of hand gestures, allowing the machine learning model to learn to recognize hand gesture(s) and retrieve image coordinates of detected objects. This may allow the machine learning component 135 to determine or predict whether the hand(s) of the individual 120 are around or near the handles 115A-B of the exits 110A-B, for example. In some aspects, if the camera 125 is installed in an orientation such that it faces towards the exit 110, the machine learning component 135 may determine whether the back of the hand of the individual 120 is detected on or near the handle 115, indicating that the individual 120 may be attempting to or preparing to open the exit 110.

In some aspects, to enable detection of non-human interference (e.g., an object 122 obstructing the exit 110), the machine learning component 135 may use object detection machine learning models to generate bounding boxes for the object(s) 122, and determine the amount of overlap between the bounding boxes and the exit 110 (or a defined portion of the exit). For example, the model(s) may generate coordinate information (e.g., bounding boxes of objects 122, and the monitoring system 105 may monitor the bottom portion of the exit 110 (e.g., for a floor-level exit 110A) to determine whether any objects 122 are blocking the exit 110 (e.g., by evaluating the percentage or ratio of the overlapping area of the objects 122 and the door bottom).

In the illustrated example, the alert component 140 uses the predictions or other output of the machine learning component 135 to selectively generate alerts 145. For example, in the case of floor-level exits (such as the exit 110A), the alert component 140 may determine (using the body keypoints) whether the foot (or feet) of the individual are pointing towards the exit 110A (or other restricted object). For example, by comparing the relative positions (e.g., coordinates) of the individual's toes or foot tip, heels or foot back, and the restricted object, the alert component 140 may determine whether the individual is facing towards the exit 110A (e.g., whether the toe keypoint is roughly on a line between the exit 110A and the heel keypoint). In some aspects, prior to generating an alert 145, the alert component 140 may determine whether the foot (or feet) have remained pointing towards the restricted object(s) for at least a threshold amount of time (e.g., at least ten seconds).

In some aspects, in order to lower false alarm rates, a ground rule may be introduced indicating unauthorized areas, such as by adding rectangular (or other polygon) lines in front of the exit 110A (or other restricted objects). If individuals 120 are discouraged or instructed to not stand within the restricted area during flight (e.g., next to the exit 110A), the alert component 140 may infer that an individual 120 detected within this area is more likely to be attempting unauthorized operation of the exit 110A.

As another example, in some aspects, the alert component 140 may evaluate data from one or more proximity sensors installed in or near the exits 110. For example, some aircraft doors have proximity sensors used to confirm whether the door is open or closed. In some aspects, such sensors can similarly be used to detect the presence or proximity of a person near the exit 110. For example, in addition the above evaluations, the alert component 140 may further determine whether the proximity sensor indicates the presence of an individual 120.

In some aspects, as discussed above, the alert component 140 may evaluate the output of the machine learning component 135 to determine whether the hand(s) of the individual 120 are located near or overlapping with the handle 115 (or other object) used to operate the exits 110 (or other restricted object). In some aspects, as discussed above, this may include determining whether the back of the individual's hand(s) are visible at or near the location of the handle(s) 115 (e.g., for at least a threshold period of time).

In some aspects, for non-human interference (e.g., an object 122 obstructing the exit 110), the alert component 140 may evaluate the percentage of overlap (e.g., the percentage of the exit 110, or portion thereof, that is overlapped by the bounding box of the object 122). For example, if alert component 140 determines that the door obstruction or obfuscation is less than 10%, the alert component 140 may determine that the exit 110 is in good condition and refrain from generating an alert 145. As another example, if the obstruction is greater than 70%, the alert component 140 may be determine to generate an alert 145 (e.g., if the door has been obstructed for at least a threshold period of time).

Generally, the particular modality and content of the alerts 145 may vary depending on the particular implementation. In some aspects, the alert component 140 provides updated status information for exits 110 (or other restricted objects) with a variety of sensory feedback, such as visual alerts, haptic feedback, and the like.

For example, the alert component 140 may activate vibration(s) (e.g., vibration alarms) and/or display warning message(s) (e.g., warning displays) via device(s) used by the operator(s) of the vehicle, such as via smartwatches, phones, tablets, and/or monitors of flight attendants and/or pilots. In some aspects, as discussed in more detail below, the alert component 140 may similarly activate vibration on the seat of one or more passengers (e.g., via a motor embedded in the seat) and/or display warning messages via the passenger displays (e.g., seatback monitors). For example, in the case of an overwing exit 110B, the alert component 140 may alert nearby passengers by transmitting alert(s) 145 to the seat(s) and/or seat display(s) of one or more nearby seats (e.g., seats within a defined proximity to the alert location), such as each seat in the same row as the overwing exit 110B, the seat(s) directly in front of and/or behind the exit 110B, and the like.

For example, suppose the alert component 140 identifies potentially suspicious activity, such as an individual 120 standing near the exit 110A with their feet pointing towards the exit 110A for a threshold period of time and/or their hand(s) on or near the handle 115A for a threshold period of time. In some aspects, the alert component 140 may deliver sensory feedback including alarms to flight attendant(s) and/or pilot(s), such as using pop-up messages and/or vibration on their watches and tablets, alarm(s) to passenger(s) sitting near the exit 110A, such as using seat vibration and/or warning messages on the passenger display systems, and the like.

Similarly, in some aspects, the alert component 140 may output alerts 145 to one or more door warning systems (e.g., existing systems used to monitor the status of doors, such as monitors indicating whether each door is open or closed). In some aspects, the alert component 140 may send warning data to other entities, such as an alert 145 to air traffic control (ATC) indicating the potential interference and enabling ATC to monitor the situation.

In some aspects, once the alert component 140 determines that the potential interference has passed (e.g., the individual 120 moved away from the exit 110A and the machine learning component 135 has not identified any further interference for at least a threshold period of time, such as ten seconds), the alert component 140 may disarm the alerts 145 or alarms. That is, in response to determining that the alert criteria are no longer satisfied, the monitoring system may terminate the ongoing alerts.

For example, in some aspects, the status of the exits 110 (or other restricted objects) can be visualized via flight attendant panels and/or head down displays (HDDs) of the pilot(s). In addition to indicating whether each door is open or closed, for example, the alert component 140 may use a coloring approach to provide enhanced information on the display(s). For example, the HDD may display colored warning icons such as a "P" to indicate a potential interference from a person and an "O" to indicate potential interference from an object. In some aspects, the icons may be colored for easy recognition, such as using red font with an orange background color. As another example, in some aspects, the flight attendant panels can provide messages such as "Person Detected" or "Object Detected" next to the exits 110, as depicted in the display.

In these ways, aspects of the present disclosure enable automated monitoring of restricted objects such as emergency exits 110 using machine learning models to provide real-time (or near real-time) updates and alerts for potential interference or obstruction of such restricted objects. This can substantially reduce the workload on operators (who are otherwise tasked with manually monitoring the exits), as well as enhancing passenger safety and comfort during operations.

Figure 2A:
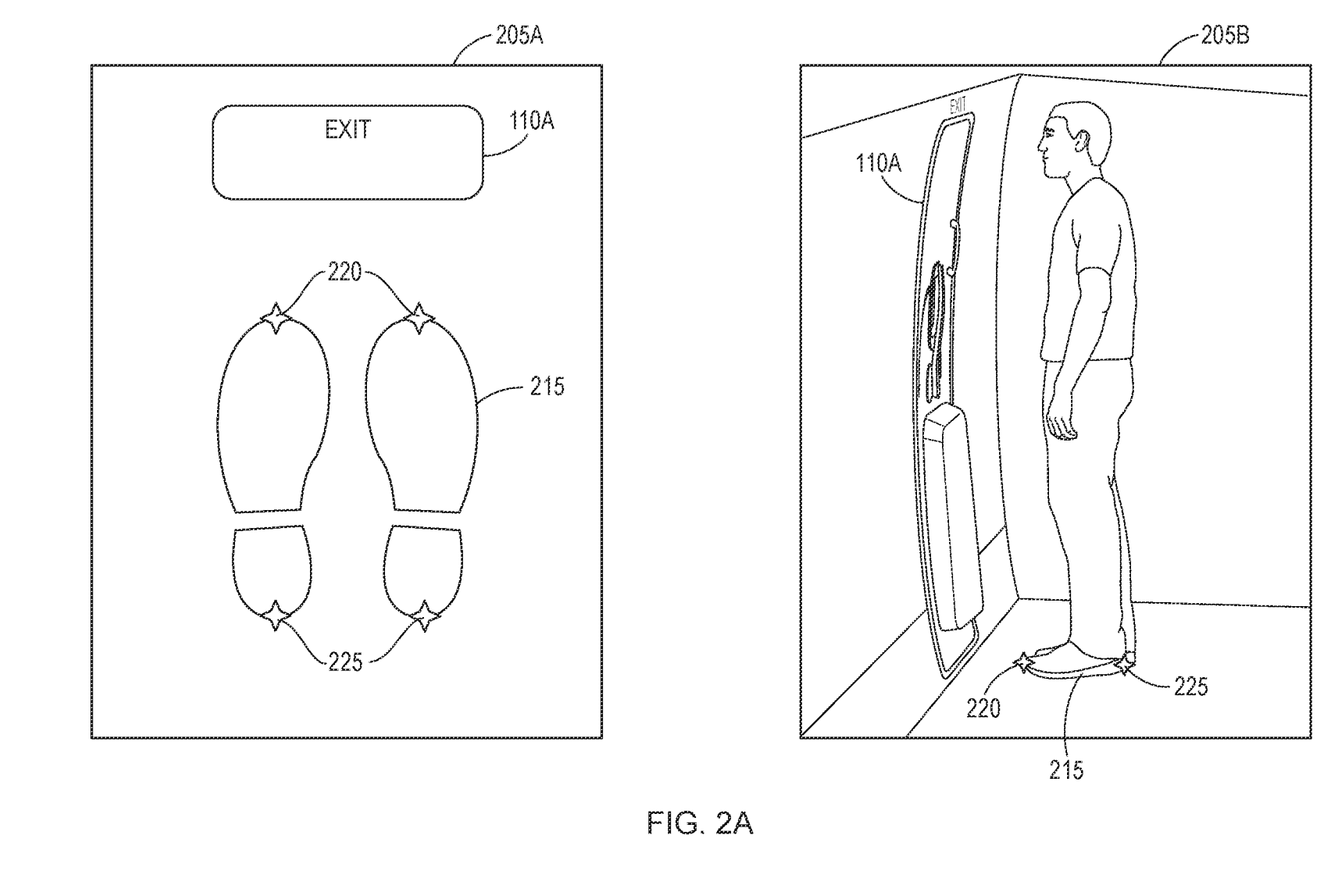
FIG. 2A depicts an example process for monitoring vehicle exits for unauthorized access, according to some aspects of the present disclosure.

FIG. 2A depicts an example process for monitoring vehicle exits for unauthorized access, according to some aspects of the present disclosure. In the illustrated example, the image 205A depicts imagery as captured by a ceiling-mounted camera (e.g., the camera 125A of FIG. 1) while the image 205B depicts imagery as captured by a side or wall mounted camera. That is, the image 205A is captured via a camera installed over a restricted object (e.g., the exit 110A) and looking vertically down, while the image 205B is captured via a camera installed to the side of the restricted object (e.g., the exit 110A) and looking sideways.

As illustrated in the image 205A, for ceiling-mounted cameras, the monitoring system may detect whether individuals are facing towards the restricted object based on the relative positioning of the detected toe point(s) 220 and heel point(s) 225. For example, in some aspects, the monitoring system may determine whether the coordinate(s) of the toe point(s) 220 are relatively higher in the image 205A (e.g., with a row index nearer or closer to the top of the image 205A), as compared to the heel point(s) 225. In some aspects, the monitoring system may similarly evaluate whether a line from a heel point 225 to the corresponding toe point 220 (of the same foot 215) intersects or points towards the exit 110A. Alternatively, the monitoring system may similarly generate a line between each heel point 225 and one or more points of the exit 110A (e.g., the left and right corners or edges of the exit 110A). The monitoring system can then determine the distance between the corresponding toe point 220 of the same foot 215 and the line(s). By evaluating this distance, the monitoring system may determine whether the individual is facing the exit 110A (e.g., where smaller distances between the toe point 220 and the line indicate that they are facing towards the exit 110A, and larger distances indicate that they are likely facing away from the exit 110A). If the monitoring system determines that the foot (or feet) is pointing towards the door (e.g., the toe point(s) 220 are higher than the heel point(s) 225, the line(s) from the heel point(s) 225 to the toe point(s) 220 intersects with the exit 110A, and the like), an alert may be generated.

Turning to the image 205B, for wall or side-mounted cameras, the monitoring system may similarly detect whether individuals are facing towards the restricted object based on the relative positioning of the detected toe point(s) 220 and heel point(s) 225. For example, in some aspects, the monitoring system may determine whether the coordinate(s) of the toe point 220 is relatively further to the left in the image 205B (e.g., with a column index nearer or closer to the left of the image 205B), as compared to the heel point 225.

In some aspects, the monitoring system may similarly evaluate whether a line from a heel point 225 to the corresponding toe point 220 (of the same foot) intersects or points towards the exit 110A. Alternatively, the monitoring system may similarly generate a line connecting each heel point 225 and one or more points on the exit 110A (e.g., the bottom edge of the exit 110A). The monitoring system can then determine the distance between the corresponding toe point 220 of the same foot 215 and the line(s) (e.g., where smaller distances indicate that the individual is facing the exit 110A, and larger distances indicate they are not). If the monitoring system determines that the foot is pointing towards the door (e.g., the toe point 220 is further to the left than the heel point 225), an alert may be generated.

In some aspects, as discussed above, the monitoring system may refrain from generating the alert(s) until the individual faces the exit 110A for at least a threshold period of time. For example, the monitoring system may determine whether the individual has been facing the exit 110A for at least M seconds before generating the alert(s).

In this way, the particular alert criteria used may vary depending on the particular implementation, such as based on the installed orientation or configuration of the camera (e.g., what view the camera has of the exit 110A).

Figure 2B:
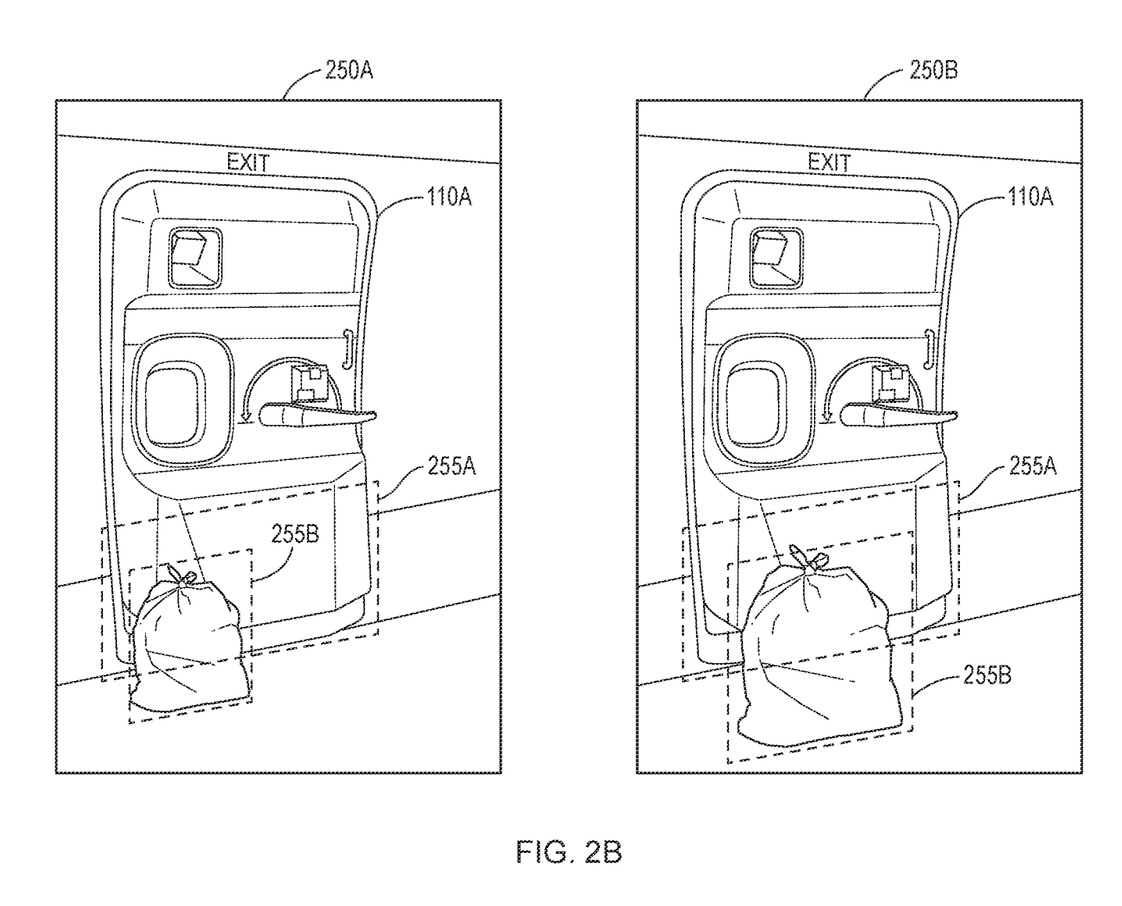
FIG. 2B depicts an example process for monitoring vehicle exits for obstructions, according to some aspects of the present disclosure.

FIG. 2B depicts an example process for monitoring vehicle exits for obstructions, according to some aspects of the present disclosure. In the illustrated example, the images 250A and 250B depicts imagery as captured of an exit 110A (e.g., a floor-level exit, such as one that may be used during boarding and deplaning by passengers) by a side or wall mounted camera. In some aspects, the exit blocking (e.g., object detection) approaches may be used on such floor-level exits (as compared to emergency exits over the wing, for example).

As illustrated in the image 250A, the monitoring system may evaluate the captured imagery using one or more object detection machine learning models to identify or generate bounding boxes (e.g., the bounding box 255B) around the detected object(s). For example, if a flight attendant places a garbage bag near the exit 110A, the camera may capture an image 250A depicting the bag, and a bounding box 255B may be generated to indicate the position of the object. Though bounding rectangles are depicted for conceptual clarity, in aspects, the monitoring system may use other bounding polygons or shapes, such as irregular polygons, continuous (e.g., smooth) bounding outlines, and the like.

In the illustrated example, the monitoring system also generates or evaluates a bounding box 255A indicating a defined portion of the exit 110A. For example, to detect the presence of objects on the floor blocking the exit 110A, the exit's bounding box 255A may be defined as the lower third of the exit 110A. In some aspects, the bounding box 255A may be defined manually. That is, the monitoring system may use a fixed definition of the exit's bounding box 255A. In some aspects, the bounding box 255A may be generated based on evaluating the imagery itself. For example, the monitoring system may process the image 250A to identify the bounding box for the entire exit 110A, and may then modify this bounding box (e.g., reducing the height of the bounding box to $\frac{1}{3}^{rd}$ the original height, and maintaining the lower bound and left and right bounds) to cover the desired area of the exit 110A.

In the illustrated example, to detect obstructions, the monitoring system can determine or quantify the overlap the bounding box 255A of the exit 110A and each bounding box 255B of any detected objects. For example, the monitoring system may determine the percentage of the exit's bounding box 255A that is overlapped by one or more object bounding boxes 255B (or, alternatively, the percentage of the exit's bounding box 255A that is not overlapped by any object bounding boxes 255B).

In some aspects, if the amount of overlap (e.g., the percentage of the bounding box 255A that is overlapped) is below a threshold (e.g., ten percent), the monitoring system may determine that no alert is needed. However, as illustrated by the image 250B, in some cases, the object's bounding box 255B may obstruct or overlap with a significant portion of the bounding box 255A of the exit 110A. In some aspects, if this overlap exceeds one or more thresholds (e.g., eighty percent), the monitoring system may generate an alert.

In some aspects, the monitoring system may use multiple thresholds to define the appropriate alert(s). For example, if the obstruction is less than a first threshold, the monitoring system may take no action. If the obstruction is greater than the first threshold but less than a second, the monitoring system may generate a "soft" alert, such as by displaying an indication of the obstruction on one or more crew displays, but refraining from more aggressive alerts such as sounds or vibrations. As another example, the monitoring system may alert some crewmembers (e.g., the flight attendants) while refraining from alerting others (e.g., the pilots). In some aspects, if the obstruction is greater than the second threshold, the monitoring system may generate further alerts, such as vibration alerts, alerting the pilots, and the like.

In some aspects, as discussed above, the monitoring system may refrain from generating the alert(s) until the obstruction exists for at least a threshold period of time. For example, the monitoring system may determine whether at least N % of the bounding box 255A has been overlapped by one or more object bounding boxes 255B for at least M seconds before generating the alert(s).

Figure 3:
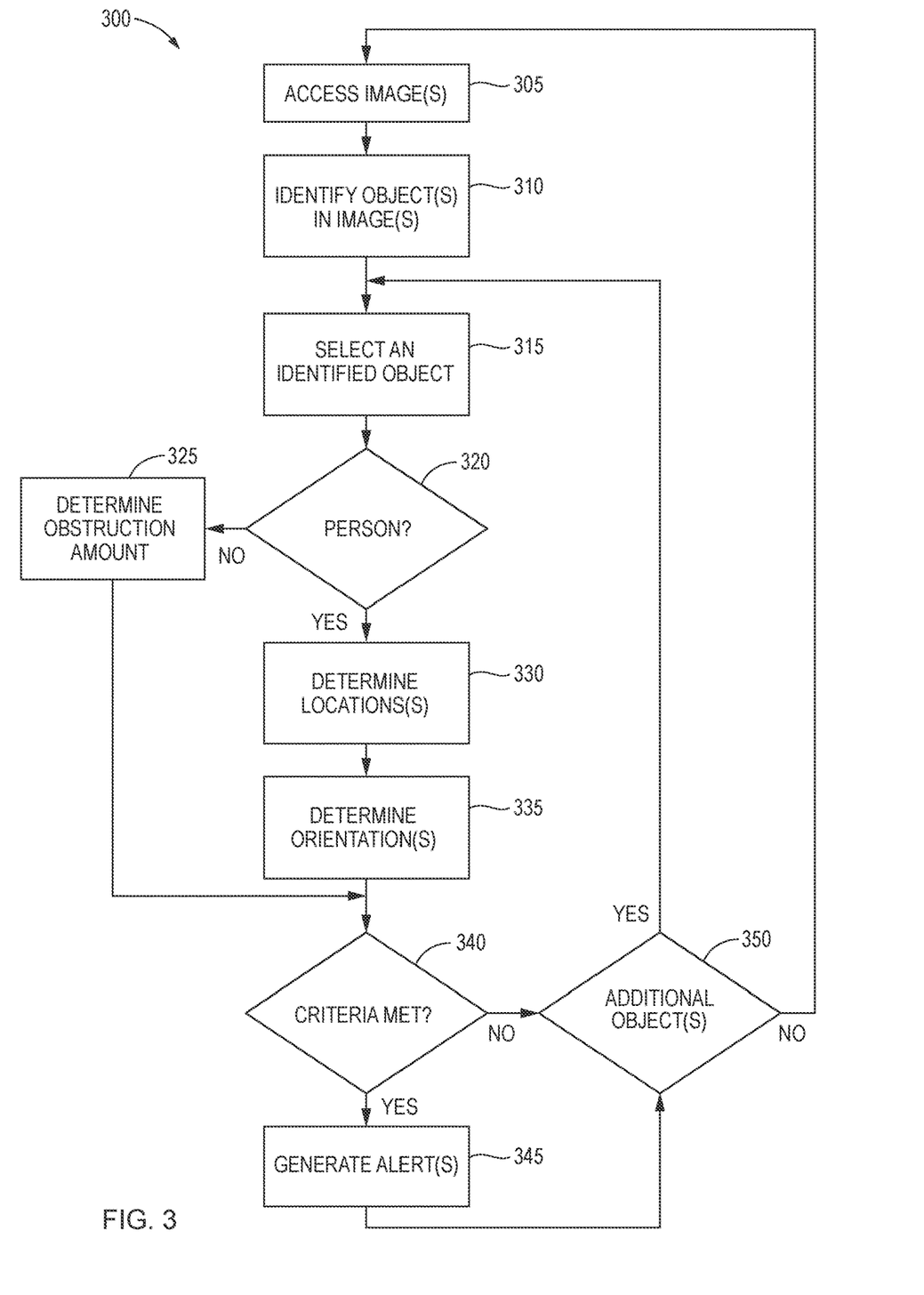
FIG. 3 is a flow diagram depicting an example method for automatically monitoring vehicle exits using machine learning, according to some aspects of the present disclosure.

FIG. 3 is a flow diagram depicting an example method 300 for automatically monitoring vehicle exits using machine learning, according to some aspects of the present disclosure. In some aspects, the method 300 is performed by a monitoring system, such as the monitoring system 105 of FIG. 1 and/or the monitoring system discussed above with reference to FIGS. 2A and/or 2B.

At block 305, the monitoring system accesses one or more images (e.g., images 205A-B and/or images 250A-B in FIGS. 2A and 2B) captured via one or more cameras (e.g., the cameras 125A-B of FIG. 1). In some aspects, as discussed above, the image(s) are captured from within an aircraft or other vehicle and depict the exit(s) (e.g., emergency exits) of the vehicle. Generally, the image(s) may depict any object, location, doorway, or other entity for which access or operation is restricted (e.g., things passengers generally should not interact with unless exigent circumstances exist, such as fire alarms or extinguishers, medical equipment, emergency exits, and the like). As discussed above, the images may generally be accessed periodically (e.g., every second) and/or continuously (e.g., as a sequence of frames in a real-time video stream).

At block 310, the monitoring system uses one or more machine learning models to identify any object(s) depicted in the image(s). For example, as discussed above, the monitoring system may process one or more of the images using one or more object detection models (e.g., models trained to detect and/or classify objects in image data). In some aspects, as discussed above, identifying the object(s) may generally include determining the location of the objects (e.g., the coordinates in the image data that correspond to or depict the object, such as using a bounding box), determining the classification or identity of the object (e.g., indicating whether it is a human, a trash bag, and the like), and the like. In some aspects, detecting the objects comprises detecting foreground objects (as compared to background objects, such as the structure of the vehicle itself).

At block 315, the monitoring system selects one of the identified object(s) in the image(s). The monitoring system may generally use any suitable criteria or technique to select the object (including randomly or pseudo-randomly), as each detected object will be evaluated during the method 300. The method 300 then continues to block 320.

At block 320, the monitoring system determines whether the selected object detection is a person (e.g., whether the detected object was classified as a person or a non-person entity by the machine learning model(s)).

If, at block 320, the monitoring system determines that the detected object is not a person (e.g., the object is a beverage cart, a trash bag, a piece of luggage, and the like), the method 300 proceeds to block 325. At block 325, the monitoring system determines the obstruction amount (e.g., the amount that the detected object obstructs the exit). For example, as discussed above, the monitoring system may generate or evaluate the bounding boxes (or other polygons or shapes) of the object and the exit (or a portion thereof, such as the lower third), and may determine the percentage of the exit's bounding box that overlaps with the object's bounding box. In some aspects, block 325 is performed only for a subset of the exit(s) of the craft. For example, the monitoring system may evaluate object obstructions for exits such as floor-level exits, but may refrain from doing so for over wing exits. In other aspects, the monitoring system may evaluate potential obstructions for all exits (e.g., including emergency exits). The method 300 then continues to block 340, discussed in more detail below.

Returning to block 320, if the monitoring system determines that the detected object is a person (e.g., a human individual such as a passenger), the method 300 continues to block 330. At block 330, the monitoring system determines the location(s) of one or more keypoints depicted in the image. For example, as discussed above, the monitoring system may process the image(s) using one or more machine learning models to detect the location of points such as the tips (e.g., toes) of the individual's foot (or feet) and/or shoes, the heel (or back) of the individuals foot (or feet) and/or shoes, and the like. In some aspects, as discussed above, the monitoring system may process the image(s) using machine learning to detect the location of points such as the individual's hand(s) in the image. As discussed above, determining the location of the keypoints may generally include determining the coordinate(s) in the image that correspond to the point(s).

In some aspects, the monitoring system may use a first set of one or more machine learning models to perform general object detection and/or classification (e.g., at block 310), and may selectively or dynamically use a second set of one or more machine learning models to detect the location(s) of specific point(s) on the human body (e.g., at block 330). That is, the monitoring system may refrain from using this second set of model(s) for object(s) that are classified as non-human (e.g., at block 320). By only using the second model(s) for human detections, the monitoring system may substantially reduce the computational expense of the method 300. For example, because only a subset of image(s) (or a subset of objects detected in the images) are evaluated using the second model, the total computational expense is substantially reduced (e.g., reducing latency, power consumption, memory usage, heat generation, and the like).

At block 335, the monitoring system determines the orientation(s) of the human individual, or of one or more body parts of the individual, based on the determined location(s). For example, as discussed above, the monitoring system may compare the heel position(s) and toe position(s) to determine or infer whether the user is facing towards the exit (or other disallowed object). In some aspects, as discussed above, the monitoring system may determine whether the front or back of the user's hand is visible (e.g., whether they appear to be reaching for the handle of the exit door).

In some aspects, in addition to (or instead of) detecting the object orientations, the monitoring system may determine the location(s) of the keypoints relative to the exit. For example, as discussed above, the monitoring system may determine whether the heel and/or toe keypoints are within a defined restricted area (e.g., a rectangle painted on the floor around an exit), which may indicate that the individual is contemplating misuse of the exit. As another example, the monitoring system may determine whether the hand of the user is on or near the position of the handle (or other interaction point) on the exit, as discussed above.

The method 300 then continues to block 340. At block 340, the monitoring system determines whether one or more alert criteria are met, based on the object detections. As discussed above, the particular criteria used may vary depending on the particular implementation. In some aspects, the alert criteria may similarly vary depending on the type of the object detection (e.g., whether the detection is a human or a non-human object).

In some aspects, the monitoring system may determine whether the detection violates one or more position and/or orientation criteria. For example, in the case of non-human objects, the monitoring system may determine whether the object obstructs the exit beyond a defined threshold (e.g., more than 80%, as discussed above). As another example, in the case of human detections, the monitoring system may determine whether the human is within a restricted region (e.g., a rectangle on the floor), whether the user is facing the exit, whether the user has their hand on or near the exit handle, and the like.

In some aspects, if such position and/or orientation criteria are met, the monitoring system may determine whether one or more time-based criteria are met. For example, in the case of detected obstructions, the monitoring system may determine whether the object has obstructed the exit for more than a threshold period of time (e.g., more than twenty seconds). As another example, in the case of human detections, the monitoring system may determine whether the human has been within the restricted space and/or facing towards the exit for more than a threshold period of time, and/or whether the individual has had their hand(s) on or near the interaction points (e.g., the handle to open the exit) for more than a threshold period of time.

In some aspects, different thresholds may be used depending on the particular detection (e.g., using shorter periods for actions that are more risky or problematic). For example, the monitoring system may use a first threshold for when an individual is detected within the restricted space (e.g., fifteen seconds), a second threshold for when the individual is determined to be facing towards the exit (e.g., ten seconds), and a third threshold for when the individual has their hand(s) on or near the exit handle (e.g., five seconds).

If, at block 340, the monitoring system determines that the one or more alert criteria are satisfied, the method 300 proceeds to block 345, where the monitoring system generates one or more alerts. In some aspects, as discussed above, the alerts may vary depending on the particular implementation, and may include output such as displaying alert(s) via one or more displays (e.g., crewmember displays, passenger displays, and the like), vibrating one or more devices (e.g., in-seat vibrations for nearby passengers, vibrating the smartwatch or tablet of crewmembers, and the like), transmitting alerts to air traffic control, and the like. In some aspects, as discussed above, the particular alerts may similarly vary depending on the particular alert criteria that are satisfied (e.g., less invasive alerts for partial obstructions or an individual standing near an exit, and more invasive or urgent alerts for full obstructions or an individual with their hand on the exit handle). The method 300 then proceeds to block 350.

Returning to block 340, if the monitoring system determines that the alert criteria are not met (e.g., no obstruction is present, the obstruction is less than a threshold, the individual is not within the restricted area, the individual has been in the area for less than a threshold period of time, and the like), the method 300 continues to block 350.

At block 350, the monitoring system determines whether there is at least one additional object that was detected in the image(s). If so, the method 300 returns to block 315 to select another object detection. If not, the method 300 returns to block 305 to receive new images. Although depicted as an iterative process (e.g., selecting and evaluating each object detection sequentially) for conceptual clarity, in some aspects, the monitoring system may evaluate some or all of the detections in parallel.

In these ways, the monitoring system can provide dynamic monitoring and alert generation to substantially improve safety and reduce workload on crewmembers, while further providing more accurate and immediate predictions regarding potential risks.

Figure 4:
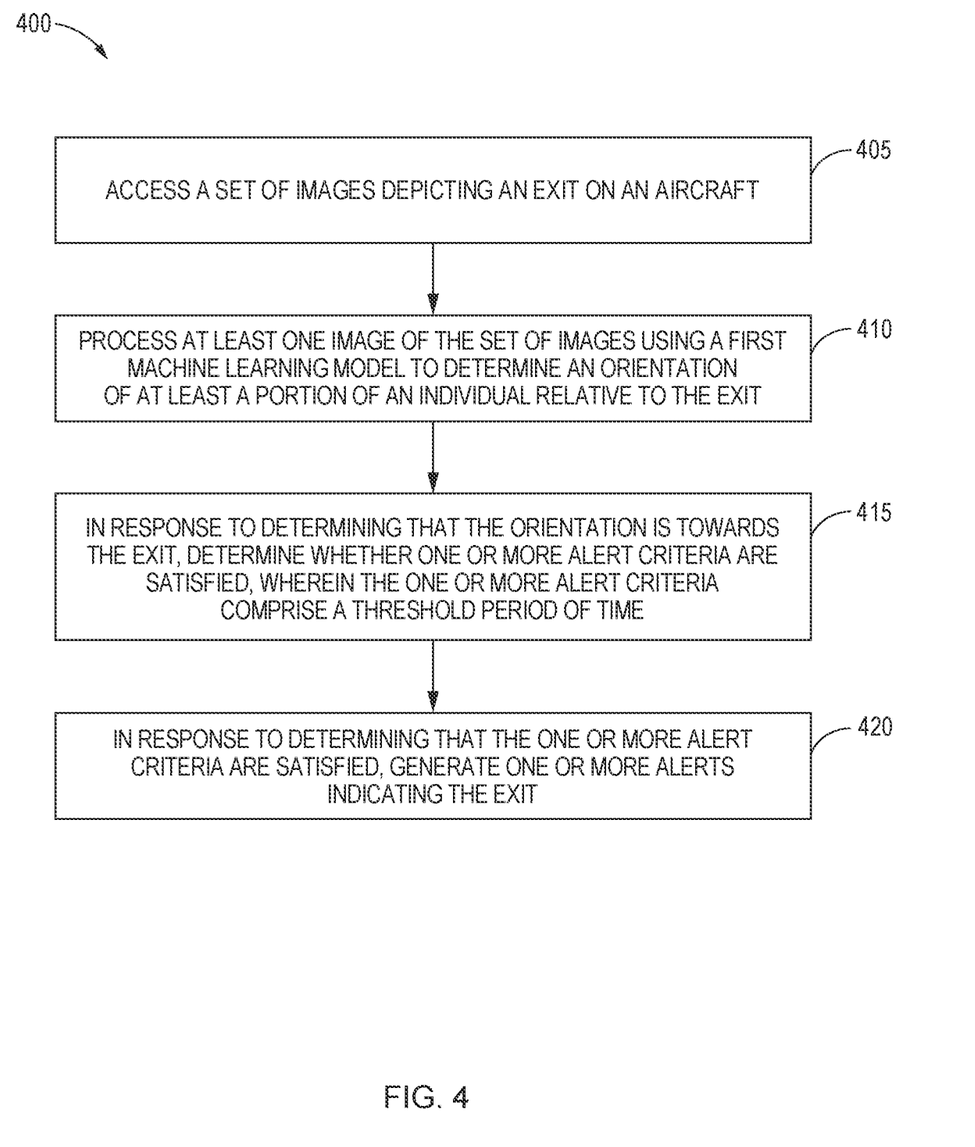
FIG. 4 is a flow diagram depicting an example method for monitoring vehicle exits, according to some aspects of the present disclosure.

FIG. 4 is a flow diagram depicting an example method 400 for monitoring vehicle exits, according to some aspects of the present disclosure. In some aspects, the method 400 is performed by a monitoring system, such as the monitoring system 105 of FIG. 1 and/or the monitoring system discussed above with reference to FIGS. 2A, 2B, and/or 3.

At block 405, a set of images (e.g., the images 205A-B and/or 250A-B of FIGS. 2A and/or 2B) depicting an exit (e.g., the exits 110A and/or 110B of FIGS. 1, 2A, and/or 2B) on an aircraft is accessed.

At block 410, at least one image of the set of images is processed using a first machine learning model (e.g., the machine learning models 565 of FIG. 5) to determine an orientation of at least a portion of an individual (e.g., the individual 120 of FIG. 1) relative to the exit.

At block 415, in response to determining that the orientation is towards the exit, it is determined whether one or more alert criteria are satisfied, wherein the one or more alert criteria comprise a threshold period of time.

At block 420, in response to determining that the one or more alert criteria are satisfied, one or more alerts (e.g., the alerts 145 of FIG. 1) indicating the exit are generated.

Figure 5:
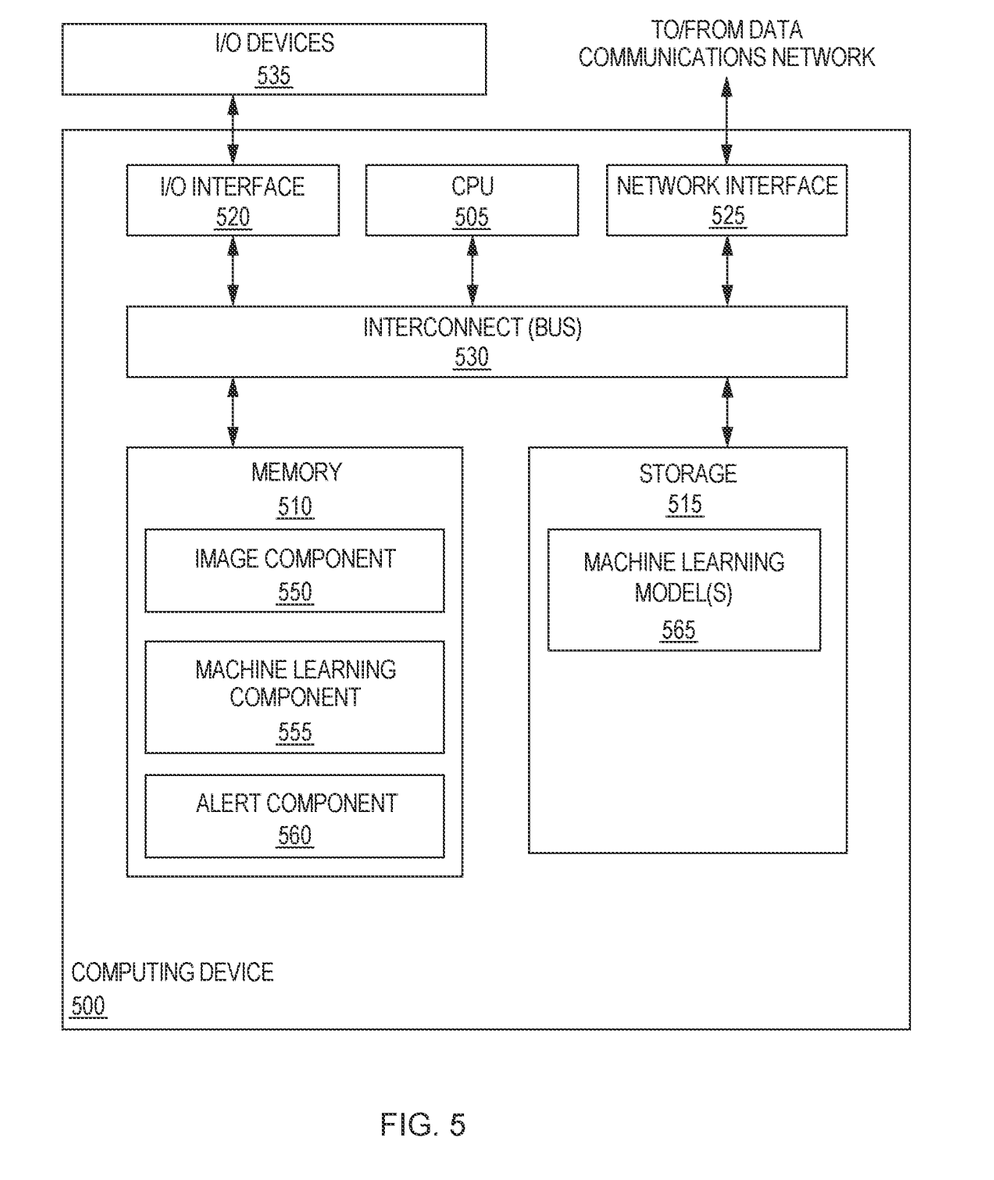
FIG. 5 depicts an example computing device for monitoring restricted objects, according to some aspects of the present disclosure.

FIG. 5 depicts an example computing device 500 for monitoring restricted objects, according to some aspects of the present disclosure.

Although depicted as a physical device, in some aspects, the computing device 500 may be implemented using virtual device(s), and/or across a number of devices (e.g., in a cloud environment). In some aspects, the computing device 500 corresponds to or comprises a monitoring system, such as the monitoring system 105 of FIG. 1 and/or the monitoring system discussed above with reference to FIGS. 2A, 2B, 3, and/or 4.

As illustrated, the computing device 500 includes a CPU 505, memory 510, storage 515, one or more network interfaces 525, and one or more I/O interfaces 520. In the illustrated aspect, the CPU 505 retrieves and executes programming instructions stored in memory 510, as well as stores and retrieves application data residing in storage 515. The CPU 505 is generally representative of a single CPU and/or GPU, multiple CPUs and/or GPUs, a single CPU and/or GPU having multiple processing cores, and the like. The memory 510 is generally considered to be representative of a random access memory. Storage 515 may be any combination of disk drives, flash-based storage devices, and the like, and may include fixed and/or removable storage devices, such as fixed disk drives, removable memory cards, caches, optical storage, network attached storage (NAS), or storage area networks (SAN).

In some aspects, I/O devices 535 (such as keyboards, monitors, etc.) are connected via the I/O interface(s) 520. Further, via the network interface 525, the computing device 500 can be communicatively coupled with one or more other devices and components (e.g., via a network, which may include the Internet, local network(s), and the like). As illustrated, the CPU 505, memory 510, storage 515, network interface(s) 525, and I/O interface(s) 520 are communicatively coupled by one or more buses 530. In the illustrated aspect, the memory 510 includes an image component 550, a machine learning component 555, and an alert component 560.

Although depicted as discrete components for conceptual clarity, in some aspects, the operations of the depicted components (and others not illustrated) may be combined or distributed across any number of components. Further, although depicted as software residing in memory 510, in some aspects, the operations of the depicted components (and others not illustrated) may be implemented using hardware, software, or a combination of hardware and software.

In the illustrated aspect, the image component 550 (which may correspond to the image component 130 of FIG. 1) is used to collect, access, and/or preprocess input images, as discussed above. For example, the image component 550 may receive captured images and perform various preprocessing operations such as scaling, resizing, denoising, converting formats, and the like.

In the illustrated example, the machine learning component 555 (which may correspond to the machine learning component 135 of FIG. 1) generally uses one or more machine learning models to evaluate images, as discussed above. For example, the machine learning component 555 may use object detection model(s) to detect the presence and location of object(s) in the image (e.g., bounding boxes), object recognition model(s) to identify or classify the object detections (e.g., to indicate whether they depict a human individual or a non-human object), pose model(s) to detect the pose or positioning of various keypoints on humans (e.g., their toes, heels, and/or hands), and the like.

In the illustrated aspect, the alert component 560 (which may correspond to the alert component 140 of FIG. 1) may be used to generate various alerts based on the object detections, as discussed above. For example, the alert component 560 may generate and display textual or visual alerts via one or more displays, audio alerts via one or more speakers, haptic alerts via one or more devices, and the like.

In the illustrated example, the storage 515 may include a set of machine learning model(s) 565. As discussed above, the machine learning model(s) 565 may generally include computer vision models trained to perform tasks such as object identification, object classification, keypoint detection, and the like. Although depicted as residing in storage 515 for conceptual clarity, in some aspects, the machine learning models 565 may reside in any suitable location, including in memory 510.

In the current disclosure, reference is made to various aspects. However, it should be understood that the present disclosure is not limited to specific described aspects. Instead, any combination of the following features and elements, whether related to different aspects or not, is contemplated to implement and practice the teachings provided herein. Additionally, when elements of the aspects are described in the form of "at least one of A and B," it will be understood that aspects including element A exclusively, including element B exclusively, and including element A and B are each contemplated. Furthermore, although some aspects may achieve advantages over other possible solutions and/or over the prior art, whether or not a particular advantage is achieved by a given aspect is not limiting of the present disclosure. Thus, the aspects, features, aspects and advantages disclosed herein are merely illustrative and are not considered elements or limitations of the appended claims except where explicitly recited in a claim(s). Likewise, reference to "the invention" shall not be construed as a generalization of any inventive subject matter disclosed herein and shall not be considered to be an element or limitation of the appended claims except where explicitly recited in a claim(s).

As will be appreciated by one skilled in the art, aspects described herein may be embodied as a system, method or computer program product. Accordingly, aspects may take the form of an entirely hardware aspect, an entirely software aspect (including firmware, resident software, micro-code, etc.) or an aspect combining software and hardware aspects that may all generally be referred to herein as a "circuit," "module" or "system." Furthermore, aspects described herein may take the form of a computer program product embodied in one or more computer readable storage medium(s) having computer readable program code embodied thereon.

Program code embodied on a computer readable storage medium may be transmitted using any appropriate medium, including but not limited to wireless, wireline, optical fiber cable, RF, etc., or any suitable combination of the foregoing. Computer program code for carrying out operations for aspects of the present disclosure may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present disclosure are described herein with reference to flowchart illustrations and/or block diagrams of methods, apparatuses (systems), and computer program products according to aspects of the present disclosure. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the block(s) of the flowchart illustrations and/or block diagrams.

These computer program instructions may also be stored in a computer readable medium that can direct a computer, other programmable data processing apparatus, or other device to function in a particular manner, such that the instructions stored in the computer readable medium produce an article of manufacture including instructions which implement the function/act specified in the block(s) of the flowchart illustrations and/or block diagrams.

The computer program instructions may also be loaded onto a computer, other programmable data processing apparatus, or other device to cause a series of operational steps to be performed on the computer, other programmable apparatus or other device to produce a computer implemented process such that the instructions which execute on the computer, other programmable data processing apparatus, or other device provide processes for implementing the functions/acts specified in the block(s) of the flowchart illustrations and/or block diagrams.

The flowchart illustrations and block diagrams in the Figures illustrate the architecture, functionality, and operation of possible implementations of systems, methods, and computer program products according to various aspects of the present disclosure. In this regard, each block in the flowchart illustrations or block diagrams may represent a module, segment, or portion of code, which comprises one or more executable instructions for implementing the specified logical function(s). It should also be noted that, in some alternative implementations, the functions noted in the block may occur out of the order noted in the Figures. For example, two blocks shown in succession may, in fact, be executed substantially concurrently, or the blocks may sometimes be executed in the reverse order or out of order, depending upon the functionality involved. It will also be noted that each block of the block diagrams and/or flowchart illustrations, and combinations of blocks in the block diagrams and/or flowchart illustrations, can be implemented by special purpose hardware-based systems that perform the specified functions or acts, or combinations of special purpose hardware and computer instructions.

While the foregoing is directed to aspects of the present disclosure, other and further aspects of the disclosure may be devised without departing from the basic scope thereof, and the scope thereof is determined by the claims that follow.

What is claimed is:

1. A method, comprising:
   accessing a set of images depicting an exit on an aircraft;
   processing at least one image of the set of images using a first machine learning model to determine an orientation of a foot of an individual relative to the exit;
   in response to determining that the orientation is towards the exit, determining whether one or more alert criteria are satisfied, wherein the one or more alert criteria comprise a threshold period of time; and
   in response to determining that the one or more alert criteria are satisfied, generating one or more alerts indicating the exit.

2. The method of claim 1, wherein determining the orientation of the foot of the individual comprises:
   identifying a toe keypoint and a heel keypoint; and
   determining that the toe keypoint is relatively closer to the exit, as compared to the heel keypoint.

3. The method of claim 1, further comprising determining an orientation of a hand of the individual.

4. The method of claim 3, wherein;
   determining that the orientation is towards the exit comprises determining that a back of the hand of the individual is visible in the at least one image; and
   determining that the one or more alert criteria are satisfied comprises determining that the hand of the individual overlaps with a handle of the exit.

5. The method of claim 1, wherein generating one or more alerts comprises at least one of:
   (i) activating a vibration alarm on a device of a crewmember of the aircraft;
   (ii) activating a warning display on a device of a crewmember of the aircraft;
   (iii) activating a vibration alarm on a seat of a passenger of the aircraft, wherein the seat of the passenger is within a defined proximity to the exit; or
   (iv) activating a warning display on a seat display of the aircraft, wherein the seat display is within a defined proximity to the exit.

6. The method of claim 1, further comprising, in response to determining that the one or more alert criteria are no longer satisfied, terminating the one or more alerts.

7. The method of claim 1, further comprising:
   processing at least one image of the set of images using a second machine learning model to determine a positioning of an object relative to the exit; and
   in response to determining, based on the positioning, that the object obstructs at least a threshold percentage of the exit, generating one or more second alerts indicating the exit.

8. A system comprising:
   one or more memories collectively storing computer-executable instructions; and
   one or more processors configured to collectively execute the computer-executable instructions and cause the system to perform an operation comprising:
      accessing a set of images depicting an exit on an aircraft;
      processing at least one image of the set of images using a first machine learning model to determine an orientation of a foot of an individual relative to the exit;
      in response to determining that the orientation is towards the exit, determining whether one or more alert criteria are satisfied, wherein the one or more alert criteria comprise a threshold period of time; and
      in response to determining that the one or more alert criteria are satisfied, generating one or more alerts indicating the exit.

9. The system of claim 8, wherein determining the orientation of the foot of the individual comprises:
   identifying a toe keypoint and a heel keypoint; and
   determining that the toe keypoint is relatively closer to the exit, as compared to the heel keypoint.

10. The system of claim 9, further comprising determining an orientation of a hand of the individual.

11. The system of claim 10, wherein;
    determining that the orientation is towards the exit comprises determining that a back of the hand of the individual is visible in the at least one image; and determining that the one or more alert criteria are satisfied comprises determining that the hand of the individual overlaps with a handle of the exit.

12. The system of claim 8, wherein generating one or more alerts comprises at least one of:
   (i) activating a vibration alarm on a device of a crewmember of the aircraft;
   (ii) activating a warning display on a device of a crewmember of the aircraft;
   (iii) activating a vibration alarm on a seat of a passenger of the aircraft, wherein the seat of the passenger is within a defined proximity to the exit; or
   (iv) activating a warning display on a seat display of the aircraft, wherein the seat display is within a defined proximity to the exit.

13. The system of claim 8, the operation further comprising:
   processing at least one image of the set of images using a second machine learning model to determine a positioning of an object relative to the exit; and
   in response to determining, based on the positioning, that the object obstructs at least a threshold percentage of the exit, generating one or more second alerts indicating the exit.

14. A method, comprising:
   accessing a set of images depicting an exit on an aircraft;
   processing at least one image of the set of images using a first machine learning model to determine an orientation of a hand of an individual relative to the exit;
   in response to determining that a back of the hand of the individual is visible in the at least one image, determining that the orientation is towards the exit;
   in response to determining that the orientation is towards the exit, determining whether one or more alert criteria are satisfied;
   in response to determining that the hand of the individual overlaps with a handle of the exit, determining that the one or more alert criteria are satisfied; and
   in response to determining that the one or more alert criteria are satisfied, generating one or more alerts indicating the exit.

15. The method of claim 14, wherein the one or more alert criteria comprise a threshold period of time.

16. The method of claim 14, wherein generating one or more alerts comprises at least one of:
   (i) activating a vibration alarm on a device of a crewmember of the aircraft;
   (ii) activating a warning display on a device of a crewmember of the aircraft;
   (iii) activating a vibration alarm on a seat of a passenger of the aircraft, wherein the seat of the passenger is within a defined proximity to the exit; or
   (iv) activating a warning display on a seat display of the aircraft, wherein the seat display is within a defined proximity to the exit.

17. The method of claim 14, further comprising, in response to determining that the one or more alert criteria are no longer satisfied, terminating the one or more alerts.

18. A method, comprising:
   accessing a set of images depicting an exit on an aircraft;
   processing at least one image of the set of images using a first machine learning model to determine an orientation of at least a portion of an individual relative to the exit;
   in response to determining that the orientation is towards the exit, determining whether one or more alert criteria are satisfied;
   in response to determining that the one or more alert criteria are satisfied, generating one or more alerts indicating the exit;
   processing at least one image of the set of images using a second machine learning model to determine a positioning of an object relative to the exit; and
   in response to determining, based on the positioning, that the object obstructs at least a threshold percentage of the exit, generating one or more second alerts indicating the exit.

19. The method of claim 18, wherein the one or more alert criteria comprise a threshold period of time.

20. The method of claim 17, wherein generating one or more alerts comprises at least one of:
   (i) activating a vibration alarm on a device of a crewmember of the aircraft;
   (ii) activating a warning display on a device of a crewmember of the aircraft;
   (iii) activating a vibration alarm on a seat of a passenger of the aircraft, wherein the seat of the passenger is within a defined proximity to the exit; or
   (iv) activating a warning display on a seat display of the aircraft, wherein the seat display is within a defined proximity to the exit.

* * * * *